United States Patent [19]
Martin et al.

[11] Patent Number: 5,115,655
[45] Date of Patent: May 26, 1992

[54] INTEGRALLY STIFFENED RINGS

[75] Inventors: James R. Martin, Mequon; James P. Kuchma, Cudahy; David U. Furrer, Waukesha, all of Wis.

[73] Assignee: Ladish Co., Inc., Cudahy, Wis.

[21] Appl. No.: 649,596

[22] Filed: Feb. 1, 1991

[51] Int. Cl.⁵ ............................................. B21H 1/06
[52] U.S. Cl. ......................................... 72/68; 72/91
[58] Field of Search ................... 72/68, 91, 117, 353.4, 72/353.6

[56] References Cited

U.S. PATENT DOCUMENTS

| | | | |
|---|---|---|---|
| 253,355 | 2/1882 | Ecaubert | 72/91 |
| 1,001,634 | 8/1911 | Goddard | 72/353.4 |
| 4,241,596 | 12/1980 | Nagatsuma et al. | 72/91 |

FOREIGN PATENT DOCUMENTS 202742 9/1986 Japan ........................................ 72/91

Primary Examiner—Lowell A. Larson
Attorney, Agent, or Firm—Foley & Lardner

[57] ABSTRACT

A method for preparing rings having an integral stiffening geometric pattern on its outer surface is disclosed. The method employs a variation of the drum rolling process, but it incorporates unique tooling for providing the pattern, preferably comprising a plurality of segments which fit together to define a ring, the inner surface of which presents the desired pattern toward the center of the ring. A unique drum arrangement includes inner and outer components for locking the segments in place and for providing the structural integrity required for the final drum rolling operation. A cylinder, for example an aluminum or aluminum alloy cylinder, is placed in the drum, the cylinder being preformed and presized to fit concentrically within the segment defining ring. Following heating of the assembly to forming temperature, the cylinder is radially expanded using a sizing tool, and the assembly is then placed over a mandrel in preparation for drum rolling. In the illustrated embodiment, an isogrid pattern of recesses is formed in the segments, so that upon completion of drum rolling and disassembly of the drum and segments, a raised, integral isogrid stiffening pattern is provided on the outer ring cylinder surface.

23 Claims, 5 Drawing Sheets

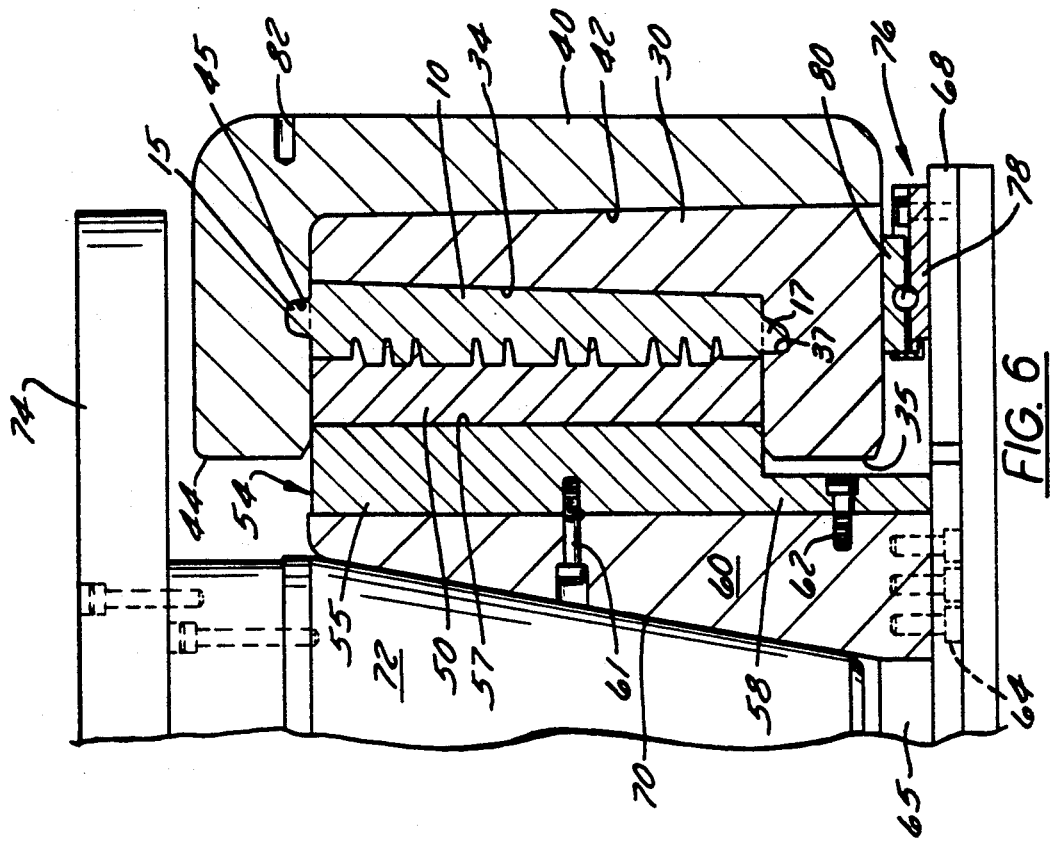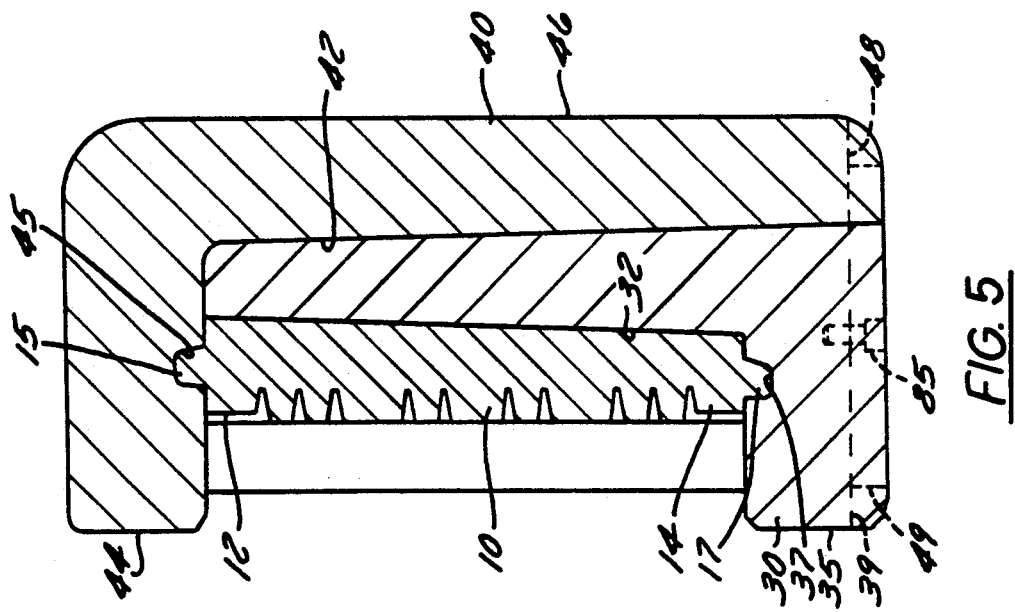

INTEGRALLY STIFFENED RINGS

BACKGROUND OF THE INVENTION

1. Field of the Invention

The present invention relates generally to the art of forming rings using processes generally known as ring rolling and drum rolling, and more particularly to forming such rings which have a pattern of stiffening elements integrally formed on their outer surfaces. Still more specifically, the invention relates to the tooling and drum components for preparing such rings. The rings produced by the process of the present invention represent unique articles which themselves are part of the invention.

2. Description of Related Art

Since the present invention employs certain aspects of known processes, this background will begin with a brief description of current ring and drum rolling processes. Such processes are employed with high and low density alloys, to form continuous, seamless rings in a variety of sizes and for numerous applications. The process typically begins with a solid raw material heated to forming temperature and subsequently upset in a press to a generally cylindrical shape of appropriate size. In most prior art processes, the blank is then placed into a pot die and back extruded with a punch into a hollow cylindrical shape. This cylinder is then conditioned and ring rolled in one or several steps, during which a bearing mounted roll pushes the cylinder between itself and a rotating drive roll. Pinch and guide rolls are also frequently involved to insure proper final geometry. As the pressure is increased, the wall thickness of the cylinder decreases, resulting in an increase in ring diameter. Various heating steps and the use of various initial and finishing ring rolls can be employed, as is generally known in the art.

Many shapes and sizes of rings can be produced using this process. Universal, cylindrical tooling (mandrel ring rolls and drive rolls) are used to prepare cylindrical, smooth rings, or the tooling can be contoured to produce rings with circumferential ribs in the inside or the outside of the cylinder. Such ribs are concentric due to the nature of the rolling process.

A variation of the ring rolling process just described is known as drum rolling and is used when it is desired to obtain tightly controlled shapes and geometries. The process differs from ring rolling in that the cylinder to be formed is placed inside a rigid, generally cylindrical drum, and that combination is then placed over the rolling mandrel. The cylinder is rolled so that its diameter increases to a designated point and completely fills the inside of the rigid drum. If it is then desired to produce external contours using the drum process, the drum or mandrel can be provided with protrusions or recesses, again in patterns which are concentric with the axis of the drum.

Rings produced by the ring and drum rolling processes can be used for many applications and can be prepared in sizes ranging from a few feet to more than twenty feet. Such rings may be employed, for example, as components of pressure vessels of the type used in aerospace equipment for containing hydrogen or oxygen. Critical design limitations for such applications include weight and strength. One way to accommodate the weight issue is to use lightweight alloys, such as aluminum alloys, titanium alloys or the like. It has also been suggested that stiffening ribs can be used for added strength and weight reduction, but prior to the present invention the formation of effective integrally formed stiffening rib patterns has not been achieved. The machining of such patterns into the outside of smooth cylinders has been attempted, but such processing is extremely time consuming and is very expensive. Moreover, it is difficult to achieve the type of precision which is required using such simple machining technology. It would represent a very substantial advance in the art of making integral ribs stiffened rings to be able to accurately produce integral rib stiffening elements in the outer surface of such rings in an efficient and cost effective manner. It would also be highly advantageous to be able to provide a variety of patterns for the integral ribs, not just concentric patterns, but patterns which include ribs which are parallel to the ring axis, or slanted in any desired pattern.

SUMMARY OF THE INVENTION

A significant feature of the present invention is a process which permits the production of rings having integral stiffening ribs in a precise pattern on the OD thereof. Another feature of the invention is the ability to create a variety of patterns of stiffening ribs on the outer surface of rings useful for many applications, such as for forming pressure vessels.

The present invention also features a unique tooling concept and a novel drum assembly for holding the tooling to prevent slippage thereof. The process also allows the tooling to be easily removed following the manufacturing process. It also provides for the use of certain pre-existing ring rolling and drum rolling equipment, with modification to mandrels and drive rolls as may be required for the specific ring design and size involved. The adaptability of the invention permits many designs to be prepared, including isogrid designs, orthogrid designs and the like. Numerous metals and alloys can also be employed in the invention.

A further important feature of the invention is the provision of rings which are strengthened through the use of integrally formed stiffening ribs, which rings have numerous applications, an important one of which is as a component of a pressure vessel, for example of the type used in rocket or other aerospace applications.

How the features of the invention discussed above are accomplished will be described below in connection with the drawings and the detailed description of the preferred embodiment. Generally, however, they are accomplished in a process which involves preparing a cylinder of the metal or alloy to be formed into the stiffened ring using conventional techniques. Tooling is prepared for creating in the outer surface of the ring the desired pattern, and in the preferred embodiment, the tool comprises a plurality of segments which, together, form a ring for surrounding the cylinder. The tool segments include recesses which are eventually filled with metal from the cylinder. A drum, preferably comprising inner and outer portions, is constructed to contain the tooling segments in a fixed spatial arrangement, and the drum includes a central opening into which the rolling mandrel will be inserted. The cylinder is placed into the drum in such a way that the outside of the cylinder is spaced apart from the inside of the tooling ring and the drum is secured about the tooling. A sizing tool is then placed within the cylinder and radial expansion of the cylinder is continued until the outside engages the tooling. The sizing step prevents slippage of the cylinder with respect to the tooling during the final rolling step. The sizing tool is removed, and the cylinder and drum assembly is placed over a mandrel, with a drive roll being provided adjacent the outside of the drum. Rolling is initiated and the pressure of the mandrel gradually increased to cause the metal in the outer portion of the cylinder to flow into the recesses in the tooling. The process is continued until the desired amount of penetration has been achieved, at which time rolling is discontinued and the cylinder-tooling-drum assembly is pulled off the mandrel. Removal of one of the drum components facilitates tool removal from the cylinder, allowing the completed ring to be lifted from the other drum component to yield the product of the present invention. Other ways in which the features of the present invention can be accomplished may appear to those skilled in the art after the present specification has been read and understood. Such ways are deemed to fall within the scope of the present invention if they fall within the scope of the claims which follow.

DESCRIPTION OF THE DRAWINGS

FIG. 5 is a vertical sectional view of the assembled tooling and inner and outer drums;

FIG. 6 is a partial side sectional view of the sizing tool and turntable used in the preferred embodiment of the invention, showing the cylinder of material to be formed into the ring with integral stiffening ribs located between the sizing tool and the tooling;

In the various FIGURES, like reference numerals are used to indicate like components.

DETAILED DESCRIPTION OF THE PREFERRED EMBODIMENT

Before proceeding to the detailed description of the preferred embodiment of the present invention, several general comments should be made about the invention, its scope and the reasons for using the illustrated example. First, an isogrid pattern is used in the description because it is a relatively complex pattern providing a high degree of strength when used for stiffening ribs for the outer surface of a ring. Furthermore, the pattern includes areas which extend vertically and on the diagonal (when viewing the finished cylinder from the side) and therefore shows how the present invention is able to desirably overcome prior art inability in preparing such patterns.

Second, with regard to the sizes of products which can be produced according to the present invention, a cylinder of approximately 40 inches in diameter is illustrated, but the invention can produce rings having integral stiffening ribs, with diameters of up to thirty feet or more.

Third, with regard to the material used, once again, there can be a high degree of variability. In the illustrated embodiment, D6 steel is used for the tooling and the drums and the ring itself is prepared from 2219 aluminum. Other tooling metals known to the art could be substituted for the D6. The ring could be made from a variety of other materials such as titanium, magnesium, or alloys such as the increasingly popular aluminum-lithium alloys.

Fourth, the end use application of the product produced according to the present invention can vary widely. A ring for use in constructing a pressure vessel for aerospace applications is illustrated, but the products could be used anywhere stiffness and weight reduction are important design criteria.

The final introductory comment relates to the illustrated technique for forming the tooling segments, i.e., by the use of EDM (see later discussion). Such segments could be made in a variety of other ways, such as casting, or they could be made by machining the tooling segments. As long as the desired pattern is created, the method for forming the tooling segments does not, in and of itself, form an independent part of the present invention.

Figure 1:
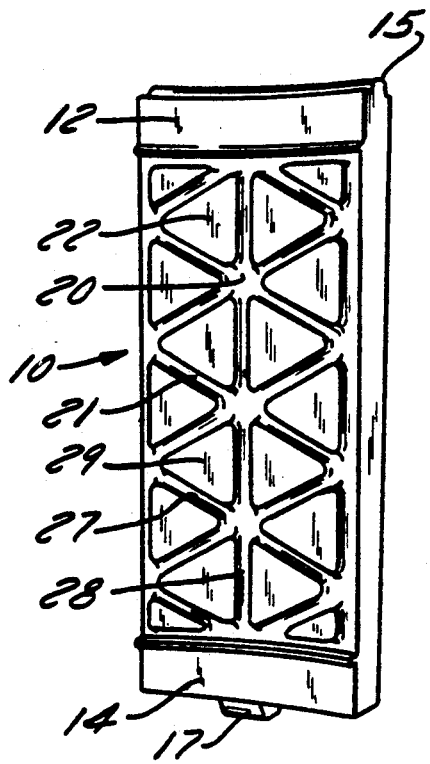
FIG. 1 is a perspective view of one of the segmented tools used to create integral stiffening ribs in a ring according to the preferred embodiment of the present invention.

Proceeding now to a description of the process of the present invention and the product produced thereby, reference should first be made to FIG. 1, showing one isogrid tooling segment 10. The segment 10 is generally concave so that the isogrid pattern is presented inwardly and includes upper and lower flats 12 and 14, respectively. Flat 12 has an arcuate rim 15 along its entire length, while flat 14 includes a centrally located tab 17 at its central portion. The purpose of rim 15 and tab 17 will become apparent shortly, and their cross-sectional configurations will become apparent from a subsequent FIGURE.

The isogrid pattern in segment 10 is made up of a plurality of nodes 20 and connecting recesses 21 which together define generally triangular faces 22 which are flush with flats 12 and 14.

The segments 10 made by the present inventors have been prepared from a D6 steel ring which was saddle rolled and formed to the desired final inside dimensions so that the ring could be cut into an appropriate number of segments. The illustrated embodiment uses 16 of such segments. The ring would be sized to allow for the cutting of fifteen individual segments, and the sixteenth was appropriately machined from stock. At this point in the process, the segments would have a smooth, concave inner surface. The selection of the number of tooling segments used will depend on the pattern to be employed and ring size. Another design criteria will be ease of segment removability.

Figure 2A:
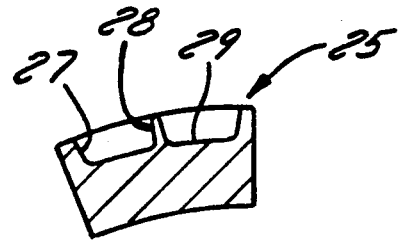
FIG. 2A is a section taking along the line 2A—2A of FIG. 2.
Figure 2B:
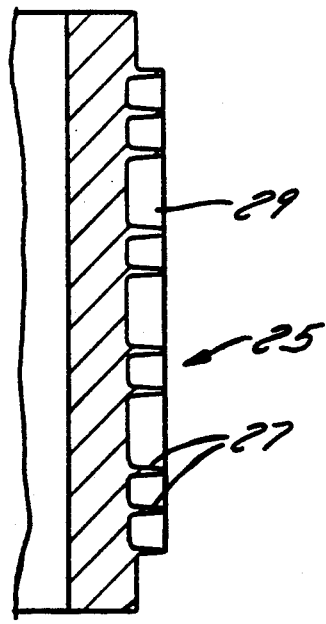
FIG. 2B is a section taking along the line 2B—2B of FIG. 2.
Figure 2:
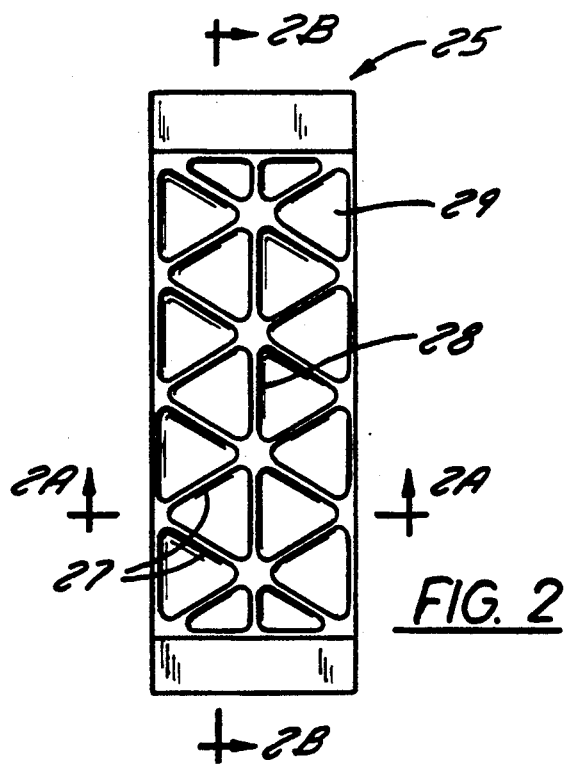
FIG. 2 is a front perspective of the EDM tooling panel used to form the tool of FIG. 1.

Referring next to FIGS. 2, 2A and 2B, an EDM tooling panels 25, made from graphite as is known in the art, is shown in frontal and in sectional views to illustrate how the isogrid configuration is created in tooling 10. The panels 25 have a generally convex face and include the raised central hubs 27, the raised ribs 28 and the recessed triangular areas 29 which together will eventually create the tooling segments 10. In the illustrated embodiment, the height of the hubs and ribs is approximately 1.25 inches. EDM technology itself is well known and the details of using the graphite panels 25 to prepare the tooling segments 10 will not be described in greater detail.

The next unique component of the present invention is an inner drum 30 shown in FIG. 3, again made from D6 steel. Drum 30 is machined on conventional equipment and is sized so that the 16 tooling segments 10 may be received snugly therein. Drum 30 includes a generally cylindrical side wall 32, an open top 31 and a bottom 34 having a central circular opening 35 therein. As will become more apparent hereafter, the opening 35 must be large enough to accommodate the sizing tool and rolling mandrel.

Figure 3:
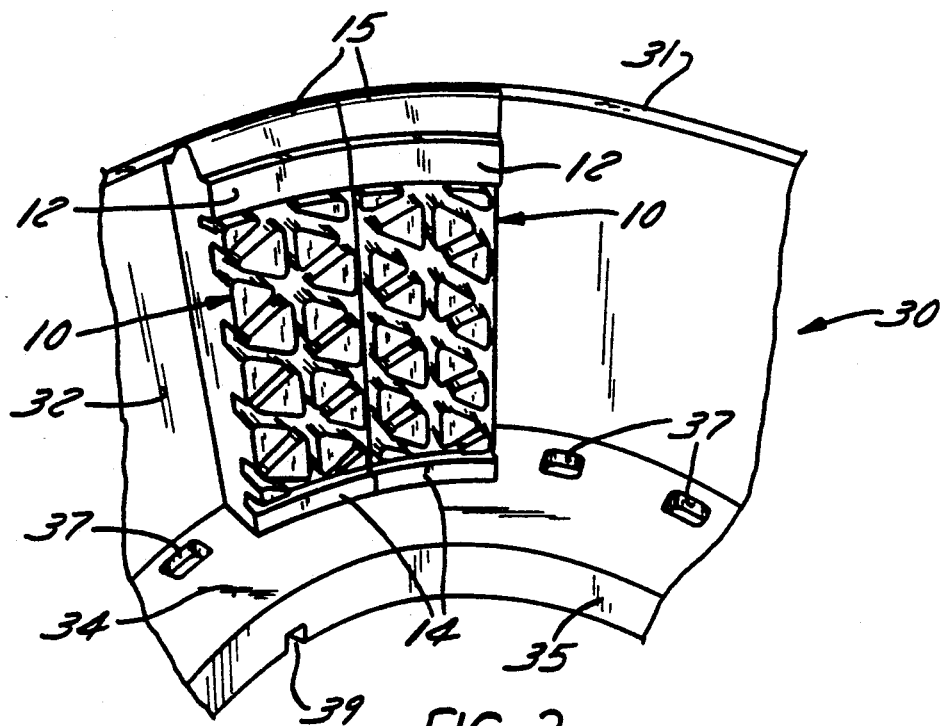
FIG. 3 is a perspective view of a portion of the inner drum component of the preferred embodiment of the present invention and illustrating the sockets for receiving tabs located on the tooling of FIG. 1.

Also shown in FIG. 3 are several of the sixteen sockets 37 which will eventually receive the tabs 17 of tooling segments 10. Also shown in this FIGURE is one of a pair of tapered slots 39, extending radially across the bottom 34. The taper contracts toward the outer edge of drum 30, as will also become apparent shortly.

Figure 4:
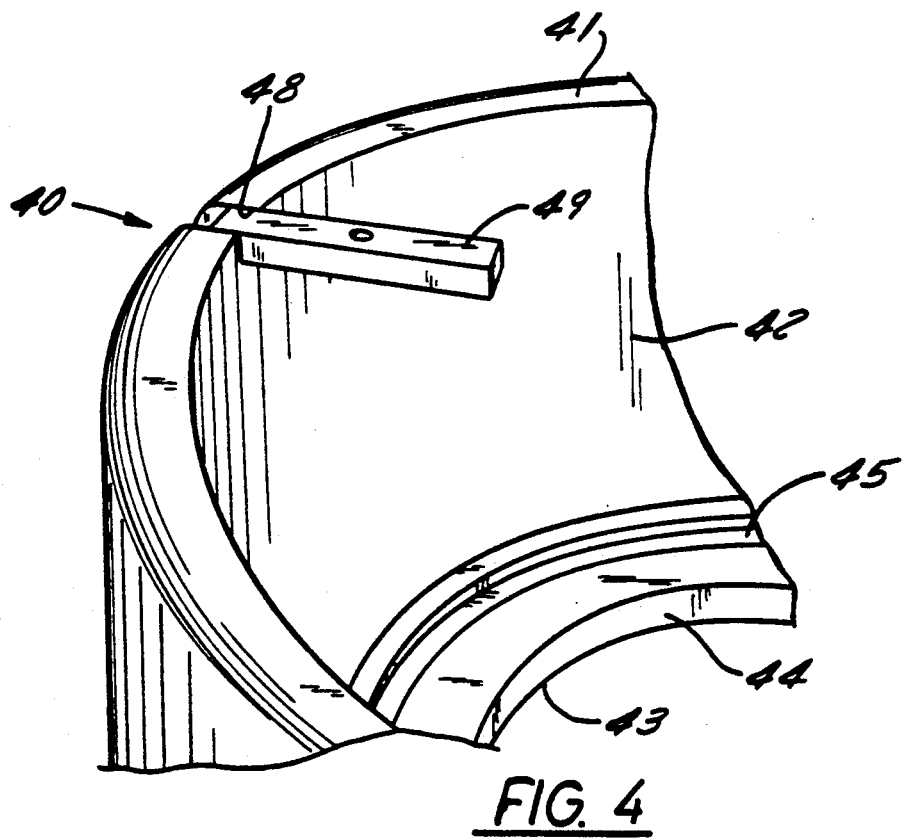
FIG. 4 is a perspective view of a portion of the outer drum component of the preferred embodiment of the present invention illustrating a wedge locking system and grooves for retaining the rim of the tooling shown in FIG. 1.

FIG. 4 illustrates the outer drum 40 which is similar in shape to drum 30, but of a greater diameter. Drum 40 includes a cylindrical side wall 42 and an open bottom 41 (the FIGURE shows the drum 40 resting on its top), the ID being sufficient to snugly receive drum 30. The top 43 of drum 40 includes a circular opening 44 (about the same size as the opening 35 in the inner drum). At the area of top 43 near side wall 42, a circular and concentric groove is formed. The groove is sized and arranged to receive the rims of tooling segments 10 when the tooling and drum components are fully assembled.

The final features of drum 40 are a pair of slots 48 (only one of which is shown in this view) in the bottom edge, preferably spaced at 180° intervals and arranged so as to mate with the slots 39 of drum 30. Again, the taper of the slots is toward the outside of the drum. Also shown in FIG. 4 is one of the two wedges 49 which are used to interlock the slots and thereby fix and lock the position of one drum with respect to the other during subsequent handling and processing operations.

The next FIGURE to be described is FIG. 5, a simple schematic of the assembled tooling segment 10 and inner and outer drums 30 and 40, respectively. It can be seen here how the two drums nest with one another, how the locking wedges 49 secure the drums in place, and how the tooling is contained in the respective drums through the use of the tabs 17 and rims 15 previously described. It should also be appreciated at this point that upon assembly of these components there will, in the preferred and illustrated embodiment, be 16 individual tooling segments which together completely fill the space around the inside of the inner drum 30 and which together present inwardly the mirror image of the pattern desired to be created in the final cylinder product. It should also be pointed out that in our preferred embodiment, the wedges 49 used to lock the drums together are bolted in place (see elements 85 in FIG. 5). Other systems for locking the drums together will also appear to those skilled in the art and could be substituted for the wedge and slots shown in the FIGURES without departing from the intended scope of the invention.

FIG. 6 is a partial side sectional view of the sizing tool used in the present invention in combination with the drum assembly just described. Before proceeding to a description of this FIGURE, it is appropriate to indicate that all of the components heretofore described will be used repetitively to form cylinders with integral stiffening ribs and that the remainder of the description will include certain processing information as to how the tool segments 10 and drums 30 and 40 are employed.

A cylinder preform 50 shown in this FIGURE is prepared using conventional techniques, and as indicated, will preferably be aluminum or an aluminum-lithium alloy. The preferred preform 50 is prepared using redundant working steps to refine and homogenize the microstructure of the aluminum stock using upset, drawdown, and a re-upset operation. Following these steps, a central hole is produced, and the piece is saddle rolled and machined to the final dimension for use in the sizing operation. The formation of the cylinder preform 50 does not, in and of itself, form part of the present invention as such steps are well known.

Preform 50 will have the desired thickness and is sized by machining to fit between the top of the outer drum and the bottom of the inner drum and up to the face of the tooling segments 10. The preform 50 needs to be expanded radially as the first step in the rib forming process, and to this end, the sizing tool 54 shown in FIG. 6 is employed. The sizing tool comprises a plurality of outwardly facing convex portions having a combined outer diameter approximately equal to the inner diameter of the preform 50. Portions 55 themselves are formed in the preferred embodiment from a ring of D-6 steel which is cut into the portions. Portions 55 have a conforming outward face 57 having a height about equal to that of the preform 50 and a backing 58 which extends behind the face 57 and which extends downwardly into the area defined by the hole 35 of inner drum 30.

Portions 55 are bolted or otherwise suitably attached to a sizing frame element 60 by bolts 61 and 62. Those frame elements likewise are generally convex in the direction of the cylinder preform and a plurality of them define a cylinder on their outer surfaces, as is well-known in and of itself. Frame elements 60 are bolted by bolts 64 to a main sizing frame 65, which frame is radially slidable on a sizing base 68.

The inside of each sizing frame element is inclined upwardly and outwardly with respect to base 68 about a concave surface 70 and, as is known, a sizing cone 72 coupled to a sizing press 74 (only a portion of which is shown) is arranged to reciprocate vertically to carry out the initial sizing operation on preform 50. From FIG. 6 it will be apparent that the deeper the penetration of cone 72, the further the radial expansion of frame elements 50 and the attached sizing portions 55. The function of this step is to radially expand the preform 50 so that it will contact tooling segments 10 and actually become partially formed therein so that when the later drum rolling steps are performed, the cylinder 50 will not slip with respect to the facing isogrid position of the tooling. It is most preferred to perform this operation in stages and to that end, a plurality of press strokes have been used.

We have also noted that the sizing operation is best accomplished if the tooling and drum assembly (10, 30 and 40) is rotated about the axis of the sizing cone 72 between each sizing stroke. To this end, a special sizing turntable 76 was made by attaching a plurality of first lower bearing races 78 to base 68 and placing a plurality of upper races 80 thereover to facilitate rotation of the assembly about the drum axis. The actual rotation was accomplished by tapping a hole 82 in the outer wall of drum 40 and inserting a shaft (not shown) therein to provide a desired amount of leverage to rotate the heavy drum assembly. The turntable could, of course, be automated, or other techniques could be employed for rotation.

In our preferred embodiment, six sizing elements 55 and six sizing frames 60 were employed and ten press strokes were used. The drum assembly had been heated to about 900° F. (which could vary, of course, depending on the material used for preform 50) prior to sizing, and the entire drum assembly and preform had been coated with a graphite for enhanced heat absorption and for lubrication purposes. Various boron compounds known to the forging art could be used instead of the graphite material used in testing we have done to date.

Figure 7:
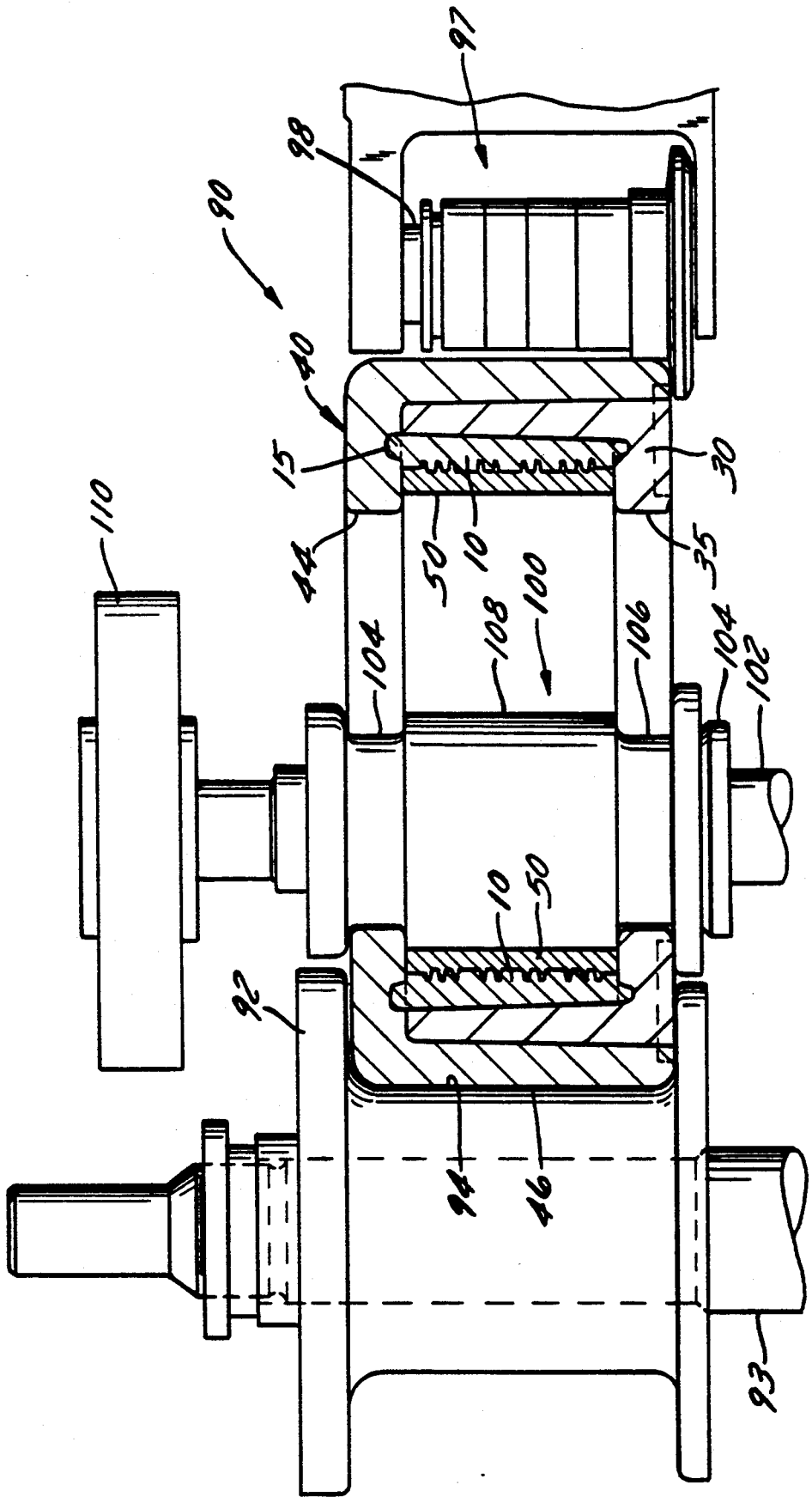
FIG. 7 is a side schematic view, partially in section, showing the mandrel, drive roll, guide roll and certain hydraulic components used to form the final product according to the preferred embodiment of the invention.

Proceeding next to a review of FIG. 7, the drum rolling device 90 used in the present invention includes a number of components which are themselves known to the drum rolling art. They include a drive roll 92 mounted on a kingshaft 93 for rotation from a drive source (not shown). In the illustrated device, the drive roll includes a recessed outer surface 94 arranged to conform to the outside of the side wall 42 of drum 40 and to operatively engage same. One or more guide rolls 97, each mounted for rotation on a suitable spindle 98, are located about the drum assembly to maintain peripheral support and a specially tooled mandrel 100 is located in the center of the drum assembly, mandrel 100 being mounted on its own spindle 102 and together with the spindle being secured to a sliding base 104 which allows the mandrel 100 to be moved toward and away from the axis of the drive roll 92.

Mandrel 100 includes an upper annular recess 104 generally conforming with the flange 44 of drum 40 and a lower recess 106 generally conforming with the flange 35 of the inner drum 30. A rolling section 108 located between the two recesses is sized for contact with the ID of cylinder 50 during the rolling process. Force imparting cylinders (not shown) which are usually hydraulic, are employed to grip the mandrel assembly at 110, and as rolling occurs, the pressure of the mandrel 100 against the inside of the cylinder 50 increases. In testing done to date, the pressure was as low as 650 psi, while it is expected that pressures as high as 2400 psi could be utilized. The amount of pressure will be heavily dependent on the type of material used, the temperature of the material, and the intricacy of the pattern of tool segments 10.

In many cases, it may be desirable to reheat the cylinder 50 (and the associated drum assembly) one or more times during the process described above. For example, a heat would usually be done prior to sizing, and may or may not be repeated again before rolling.

Following drum rolling, the drum assembly is removed from around the mandrel 100 and the locking wedges 49 are removed. The next step is the removal of the inner drum 30, followed by removal of the tool segments 10. This last step, permits removal of the formed cylinder 120 from the outer drum 40.

Figure 8:
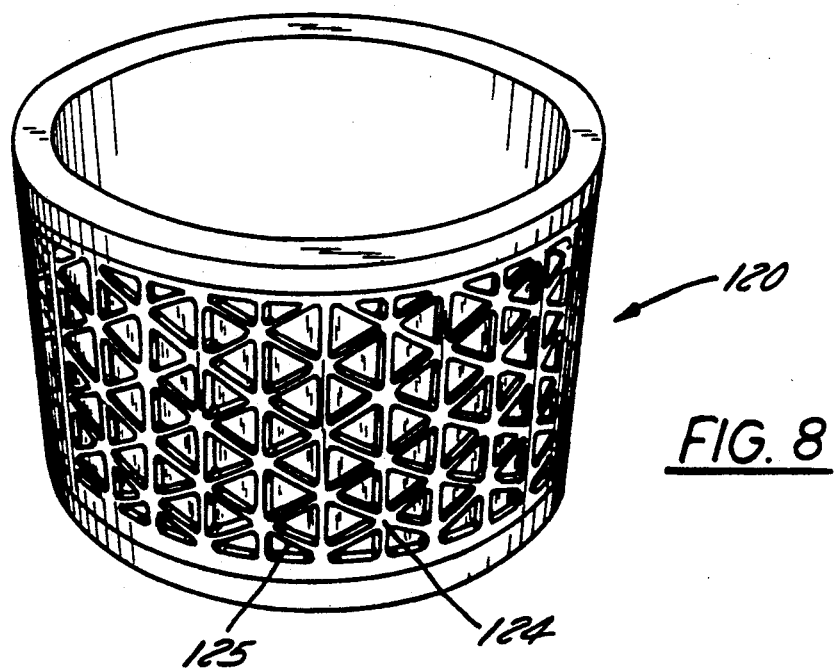
FIG. 8 is a perspective view of an isogrid cylinder prepared according to the preferred embodiment of the invention.

FIG. 8 shows a cylinder 120, integrally stiffened with ribs in an isogrid pattern made in accordance with the above described process. In testing done to date, fill was considered to be excellent, taking into account the low rolling pressures employed. The nodes 124 filled the best, while the lowest fill was noted at the midpoint of each rib 125. Increased rolling temperatures and/or increased rolling pressure would accomplish greater and more even fill.

As mentioned previously, many modifications can be made in the above-described tooling and in the processing steps to fully capture the benefits of the present invention. For example, for larger cylinders, EDM could be used to make smaller tool segments which would then be bolted together to form larger segments. Depending on pattern intricacy and other factors, CNC machining of all panels could also be used, as could casting. So while the present invention has been described in connection with a preferred and illustrated embodiment, it is not to be limited to the foregoing description, but it is to be limited solely by the scope of the claims which follow.

What is claimed is:

1. A process for preparing a ring having a pattern of integral elements at its outer surface, the process comprising the steps of:
   preparing a plurality of arcuate tooling segments, each having a concave face containing contours defining a pattern;
   providing a generally cylindrical drum assembly for holding the segments in a fixed orientation with the faces of the tooling directed toward the axis of the assembly;
   placing a ring preform within the assembly, the outer surface of which confronts the faces;
   heating the preform to a malleable state;
   radially enlarging the preform so that the preform is at least partially interlocked with the tooling; and
   drum rolling the ring preform against the tooling segments to create the integral elements in the outer surface thereof.

2. The process of claim 1 wherein the heating step occurs prior to the step of radial enlarging.

3. The process of claim 2 wherein the step of radial expanding is carried out by sizing the preform into the contours of the tooling segments.

4. The process of claim 3 wherein the sizing is accomplished by employing a conical sizing press and a plurality of sizing segments having portions confronting the interior surface of the ring preform.

5. The process of claim 3 wherein the sizing is performed in a plurality of steps to gradually radially expand the ring preform.

6. The process of claim 5 wherein the assembly is rotated about its axis between the sizing step.

7. The process of claim 1 wherein the tooling segments comprise a sufficient number of arcuate segments to define a generally cylindrical tooling assembly.

8. The process of claim 1 wherein each of the tooling segments includes at least one component for being received by the drum assembly.

9. The process of claim 1 wherein each of the tooling segments includes a rim on one end and a tab on an opposed end and the drum assembly includes sockets for receiving the tabs and a groove for receiving the rims.

10. The process of claim 1 wherein said drum assembly comprises:
   a.) an inner generally cylindrical drum having an open top and a bottom having an annular opening at the center thereof and
   b.) an outer generally cylindrical drum having an open bottom and a top having an annular opening at the center thereof, the inner drum nesting within the outer drum so that the OD of the inner drum is slidingly received within the ID of the outer drum.

11. The process of claim 1 comprising the further step of locking the inner drum to the outer drum after the tooling segments have been placed therein.

12. The process of claim 10 wherein the tooling segments comprise a sufficient number of arcuate segments to define a generally cylindrical shaped tooling assembly which has an outer face confronting the inner cylindrical surface of the inner drum.

13. The process of claim 12 wherein each tooling segment has a tab and a rim and wherein the inner drum includes a plurality of sockets for receiving the tabs and wherein the outer drum includes a groove for receiving the rims.

14. A drum rolling assembly for use in a process in which a ring is rolled to produce a pattern of integral elements in its outer surface, said assembly including:
 tooling segment means for forming the pattern in the ring;
 an outer drum;
 an inner drum for being nested within the outer drum; and
 means for holding the tooling segment means in a fixed orientation when the inner and outer drums are nested, and wherein the inner drum is generally cylindrical and includes an open top and a bottom having an annular opening at the center thereof and the outer drum is generally cylindrical and has an open bottom and a top having an annular opening at the center thereof, the inner drum resting within the outer drum so that the OD of the inner drum is slidingly received within the ID of the outer drum.

15. The assembly of claim 14 wherein the tooling segment means comprise a plurality of arcuate tooling segments, each of which has a concave inner face containing impressions suitable for forming a portion of the pattern.

16. The assembly of claim 15 wherein a sufficient number of the tooling segments are provided to define a generally cylindrical shaped ring adapted to fit within the inner drum.

17. The assembly of claim 14 wherein each tooling segment includes at least one component for being received by the inner and outer drums.

18. The assembly of claim 14 wherein each tooling segment includes a tab on one end and a rim on the opposite end and wherein the tab and rim are adapted to be received by the inner and outer drum respectively.

19. The assembly of claim 14 wherein the tooling segment means comprise a plurality of arcuate tooling segments, each of which has a concave inner face containing impressions suitable for forming a portion of the pattern.

20. The assembly of claim 19 wherein a sufficient number of the tooling segments are provided to define a generally cylindrical shaped ring adapted to fit within the inner drum.

21. The assembly of claim 20 wherein each tooling segment includes at least one component for being received by the inner and outer drums.

22. The assembly of claim 20 wherein each tooling segment includes a tab at the bottom thereof and a rim along the top thereof, the inner drum including a plurality of sockets in its bottom arranged to receive the tabs and the outer drum having a circular groove around its top arranged to receive the rims.

23. The assembly of claim 14 further comprising means for locking the inner drum to the outer drum.

* * * * *